INVENTOR.
WALTER W. LEE
BY
Constantine A. Michalos
ATTORNEY

INVENTOR
WALTER W. LEE
BY
Constantine A. Michalos
ATTORNEY

United States Patent Office 3,341,826

Patented Sept. 12, 1967

3,341,826

SOLID STATE ERASABLE AND REWRITABLE OPTICAL MEMORY SYSTEM UTILIZING A TENEBRESCENT PANEL

Walter W. Lee, Allendale, N.J., assignor to The Bendix Corporation, Teterboro, N.J., a corporation of Delaware Filed Feb. 25, 1964, Ser. No. 347,271
15 Claims. (Cl. 340—173)

This invention relates to memory systems, and particularly to a random access solid state erasable and rewritable optical memory system.

The present invention utilizes digital optical memory elements having photoconductive and electroluminescent sections providing micro bits of information that can be erasable and rewritable on a tenebrescent section by the electroluminescent sections. The tenebrescent section is made up of a material that becomes dark or opaque upon exposure to ultra violet rays or is bleached by irradiation with a brilliant light, such material, for example, may be formed of a layer of rhodium aluminum silicate, hackmanite, or gillespite. Optical memory systems, by making use of the higher resolution inherent in microphotographic process, achieve a high storage density, several orders of magnitude high than that obtainable by the present day memory systems having magnetic drums.

The present invention provides an optical memory system that has an additional characteristic in that the bits of information can be changed using nothing external to the device. Solid state optical memory systems of the type described in my co-pending U.S. application Ser. No. 330,098, filed Dec. 12, 1963, and assigned to The Bendix Corporation, assignee of the present invention, are normally non-erasable. The non-erasable memory systems are provided with a readout section having a series of parallel electrical conductors extending in the X-axis direction, a series of parallel electrical conductors extending in the Y-axis direction and a photoconductor interposed therebetween. In addition, the non-erasable optical memory system is provided with an information section comprised of an illuminating source such as an electroluminescent panel and an information mask.

The present invention provides for a memory system that has a read-out section that is the same as in the non-erasable memory system as outlined above. However, in order for the memory system to provide for the erasable and the rewritable features, the present invention discloses a memory system that provides, within its information section, an erasable storage section in place of the non-erasable mask of the non-erasable memory system described in U.S. application Ser. No. 330,098. The storage section comprises a tenebrescent panel that is used for accumulating removable information. The information section is also provided with an insulating matrix, several series of parallel electrical conductors extending in one direction, several series of parallel electrical conductors extending transversely to the first series of parallel conductors, and two electroluminescent panels interposed between the conductors.

All of the conductors, in both the erasable and non-erasable memory systems, are energized by an electric current to light or otherwise activate the electroluminescent or photoconductive elements.

In detail, in this optical memory system, the readout section provides for a series of parallel closely spaced electrical conductors extending in a Y-axis direction, another series of closely spaced transparent conductors extending in the X-axis direction, and a photoconductive element interposed between the Y-axis conductors and the X-axis conductors. The conductors are then connected to a computer means comprising an input signal address selector and an output signal computer as provided in my co-pending U.S. application Ser. No. 330,098.

The information section of this invention, as hereinbefore referred to is distinctly different than the information section of my co-pending application in both its construction and its arrangement. As herein more fully disclosed, the difference is necessary to produce with its tenebrescent storage means the erasable and rewritable features to be used by the above-referred to read-out section in conjunction with the computer means for the operation of this system.

More specifically, the storage section is provided with means on which information is written such as a layer of tenebrescent material. The tenebrescent material is placed adjacent the transparent X-axis conductors of the readout section. Next to this is placed, in the information section, a homogeneous screen mesh type matrix, which is opaque except at bit points adjacent all the intersections of the X and Y conductors.

It should be noted that the tenebrescent material provided herein may be, as brought out before, a layer of rhodium aluminum silicate which has the characteristic of becoming dark when exposed to ultra violet light and to be bleached to its original transparent state upon irradiation with a brilliant light. It should also be understood that the matrix used herein is not an information mask as disclosed in my co-pending U.S. application Ser. No. 330,098, but serves to provide an opaque insulated area between adjacent transparent bit points. That is, it isolates each transparent bit point from all the others to insulate each intersection of the conductors from all the others. The tenebrescent material is substituted for the mask for storing the bit point information as herein more fully described.

Next to the matrix are placed two sets of conductors. The two sets of conductors share a single series of conductors extending in one direction and two series of conductors extending transverse to the single series of conductors. The three series of conductors thereby defining intersections or crossings which are positioned adjacent each bit point of the matrix.

As in the set of conductors of the readout section, the two sets of conductors next to the matrix have interposed therein electroluminescent panels in place of the photoconductor. One set of conductors comprise a series of parallel closely spaced electrical conductors extending in the X-direction and a series of parallel closely spaced electrical conductors extending in the Y-direction. Interposed between these series of conductors is a thin layer of electroluminescent compound fluorescing in a spectral band which will either render opaque or bleach the tenebrescent compound. The other set of conductors comprise the Y-axis conductors of the first set and an additional set of conductors extending in the X-axis direction. Interposed therebetween is another layer of electroluminescent compound which fluoresces in a spectral region and which will either bleach or render opaque the tenebrescent compound in a manner opposite to that of the first layer of electroluminescent compound as hereinafter more fully explained. It should be added that all of the internal conductors and panels must be transparent to permit light therethrough; and, in addition, all of the intersections of the three sets of conductors must be in a straight line and in line with a bit portion as defined by the bit matrix screen. This is necessary for the proper operation of the optical memory system as hereinafter more fully described.

An object of this invention, is to provide an optical memory system that is writable, readable, and erasable within itself.

Another object of this invention is to provide a tenebrescent material between a read-out section and an electroluminescent information section whereby bits of information may be written by the electroluminescent section on said tenebrescent material by means of ultra violet light, which darkens the exposed area, and which may be bleached back to its original state upon irradiation with light in the range of 550 millicrons, both the clear and the darkened states being stable.

A further object of this invention is to provide a memory system having extremely low volume, negligible access time, low power requirements and which can readily be utilized as an erasable and rewritable memory recorder.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figures 1, 2:
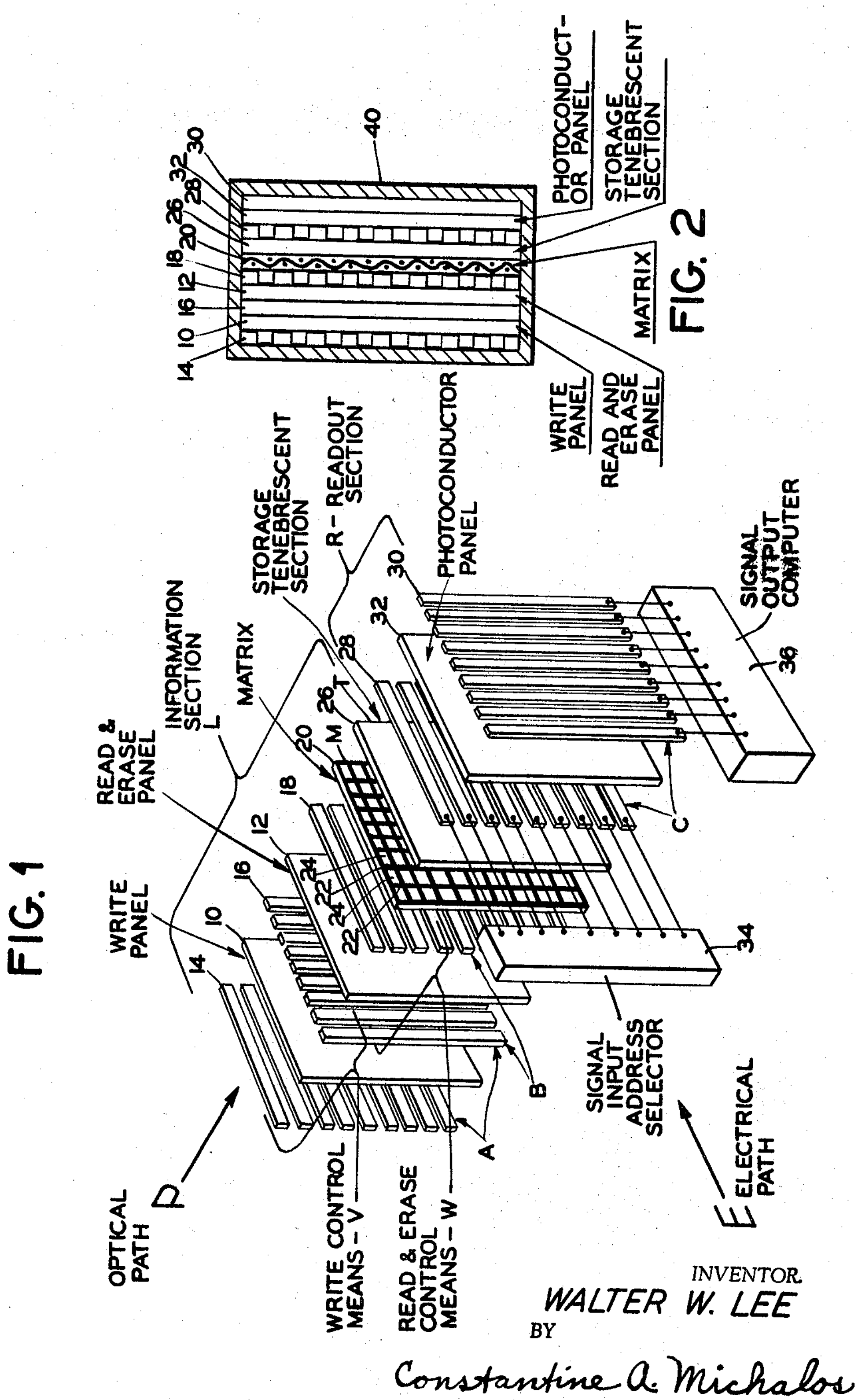
FIGURE 1 is a schematic of an exploded perspective view of the memory system in accordance with a preferred embodiment of the invention.
FIGURE 2 is a side view of the device shown in FIGURE 1, but in an assembled position.

Referring now to FIGURES 1 and 2 of the drawing in detail, it will be seen that the optical system is a sandwiched type structure provided with two separate paths, a first path such as an optical path P and a second path such as an electrical path E. To produce these paths, the structure is provided with two sections, a readout section R, and an information section L. The information section L is further provided with a matrix M and a storage tenebrescent section or panel T.

The information section L is provided with a plurality of electroluminescent lamps operable to project a predetermined pattern of lights directed through the matrix M and tenebrescent section T to form a plurality of darkened areas adjacent transparent areas which extend uniformly in rows and columns on the tenebrescent material, indicating the coded information. The readout section is provided with a photoconductor panel operable by a set of electrical conductors to provide the switching system for said pattern of lights to thereby read out the coded information.

The optical path P provides a means of optically producing and sensing the pattern of lights or coded information on the tenebrescent panel, and the electrical path E provides means of scanning or otherwise directing electrical signals into the readout section R to pick up the information directed from the information section L into the readout section R.

Referring particularly to the structure, this optical memory system comprises three sets of conductors which further comprise three series of X-axis conductors and two series of Y-axis conductors. In addition, this memory system comprises five other essential parts or panels which are interposed between the conductors to form with an electronic system the completed structural assembly.

As viewed from left to right in FIGURE 1, the memory system is provided with a pair of controlled luminescent sources V and W. The first luminescent source V comprises a thin layer of electroluminescent compound or panel 10 energizable by a first set of electrically coupled conductors A, and a second luminescent source W comprises a thin layer of electroluminescent compound or panel 12 energizable by a second set of electrically coupled conductors B. The first luminescent source V is used as the "write" control means comprising the first set of conductors A referred to hereinbefore which are made up of a series of closely spaced parallel conductors 14 extending in the X-axis direction and a series of closely spaced parallel conductors 16 extending in the Y-axis direction with the write electroluminescent panel 10 interposed between the X-axis conductors 14 and the Y-axis conductors 16. The second luminescent source W is used as a "read and erase" control means comprising the second set of conductors B, referred to hereinbefore, which are made up of the Y-axis conductors 16 of the first set of conductors A and another series of closely spaced parallel conductors 18 extending in the X-axis direction, with the read and erase electroluminescent panel 12 interposed therebetween.

As shown in FIGURE 2, the conductors and the electroluminescent panels are physically connected with the Y-axis conductors 16 forming intersections with both the X-axis conductors 14 and the X-axis conductors 18. The intersections formed between the Y-axis conductors 16 and the X-axis conductors 14 are aligned with the intersections formed between the Y-axis conductors 16 and the X-axis conductors 18. In addition, it should be noted that the conductors and the electroluminescent panel 12 positioned within the structure of the memory system must be transparent to permit the passage of light waves from the electroluminescent panel 10 to be directed through the memory system for reasons as herein more fully explained. The conductors can be fabricated from material such as glass coated with a conductive paint of any well known material, such as gold. These conductors are closely spaced to provide a very high density.

Adjacent the second luminescent source W, next to the X-axis conductors 18, is located the matrix M and tenebrescent section T. These sections comprise a matrix or photographic mask 20 which is opaque except at the intersections of the two sets of conductors A and B. The mask 20 serves to provide opaque insulating areas 22 between adjacent transparent bit point areas 24. The opaque areas 22 isolate adjacent transparent areas 24 evenly throughout the surface of the mask 20. The different effect between the location of the transparent areas 24 of the present memory system and the transparent areas of my co-pending U.S. application Ser. No. 330,098, is that in the present system the transparent areas 24 are not used as coded bits of information but are all spaced and located evenly throughout the surface of the mask to provide a homogeneous matrix having each bit point transparent area 24 isolated from adjacent bit point areas. The plurality of transparent bit point areas 24 extend uniformly in rows and columns in the plane of the mask and are transversely aligned with the intersections formed between the Y-axis conductors 16 and the X-axis conductors 14 and 18 to insulate these intersections from each other.

It should be understood that in order for the information section L to furnish coded information to the memory system, it comprises the two luminescent sources V and W with its activating electronic systems.

Adjacent to the mask 20, the storage section T comprises a single layer of normally transparent tenebrescent material or panel 26, such tenebrescent panel 26 has the characteristic of becoming dark when exposed to ultra violet light and to be bleached to its original transparent state upon irradiation with a brilliant light.

Therefore, in order that the electroluminescent panels 10 and 12 write, read, and erase coded information on the tenebrescent panel 26, they fluoresce in a spectral band which will either render opaque or bleach the tenebrescent compound. That is, both of the electroluminescent panels 10 and 12 are basically made of the same material such as zinc sulfide except that one of them, such as the read and erase electroluminescent panel 12, is dopped with impurities such as copper to produce thereby a different wave length than the write electroluminescent panel 10. That is, the write electroluminescent panel 10 provides for a spectral band which will either render opaque or bleach the tenebrescent panel 26 and the read and erase electroluminescent panel 12 will fluoresce in spectral band which will either bleach or render opaque the tenebrescent panel 26 in an opposite manner to the action of the write electroluminescent panel 10. Therefore, using this arrangement, to write a bit of information on the tenebrescent panel 26, the write electroluminescent panel 10 will be activated at one wave length by conductors A; to read or transfer the written material of the tenebrescent panel 26 to another part of the memory system, the read and erase electroluminescent panel 12 will be activated at another wave length by conductors B, but at a low voltage; and to erase information on the tenebrescent panel 26, read and erase electroluminescent panel 12 is activated by conductors B but at a higher voltage than for reading, to thereby bleach the tenebrescent panel 26.

Referring now particularly to the structure found in the readout section R, it can be seen from FIGURES 1 and 2 that it comprises X-axis and Y-axis conductors with a photoconductive material interposed therebetween as described in my co-pending U.S. application Ser. No. 330,098. FIGURE 1 shows a third set of conductors C comprising one series of closely spaced parallel conductors 28 extending in the X-axis direction, another series of closely spaced parallel conductors 30 extending in the Y-axis direction, and a photoconductive element or panel 32 interposed therebetween. The series of X-axis conductors 28 presenting the source of input voltage signal by being connected to an input signal address selector 34 and the series of Y-axis conductors 30, providing the means for receiving the voltage signal by being connected to an output signal computer 36. The input signal address selector 34 and output signal computer 36 provide the electronic readout computer means for reading the information presented to the photoconductor 32 by the tenebrescent panel 26. The X-axis conductors 28, located between the tenebrescent panels 26 and the photoconductor 32, must be fabricated of transparent conductive material as well as the conductors 16 and 18, to permit the various light signals to travel from one end of the assembly to the other. Therefore, by being transparent, the X-axis conductors 28 permit light from the electroluminescent information section L to pass on to the photoconductor 32, to be absorbed by the photoconductor 32 as herein provided. The photoconductor 32 may also be made of a transparent fluid coating which is laid between the entire surface of the X-axis conductors 28 and Y-axis conductors 30.

Referring to FIGURE 2, it can be seen that the entire memory system may be encased in a housing, such as a suitable opaque casing 40. The opaque casing provides shielding from stray ambient light and for supporting the X-axis conductors 14, the write electroluminescent panel 10, the Y-axis conductors 16, the read and erase electroluminescent panel 12, the X-axis conductors 18, the matrix 20, the tenebrescent material 26, the X-axis conductors 28, the photoconductor 32, and the Y-axis conductors 30. This whole unit may be completely encased in the housing 40 with only lines leading to an electrical system, partly shown in FIGURE 4, for sending desired signals through the memory system.

Figures 3, 4:
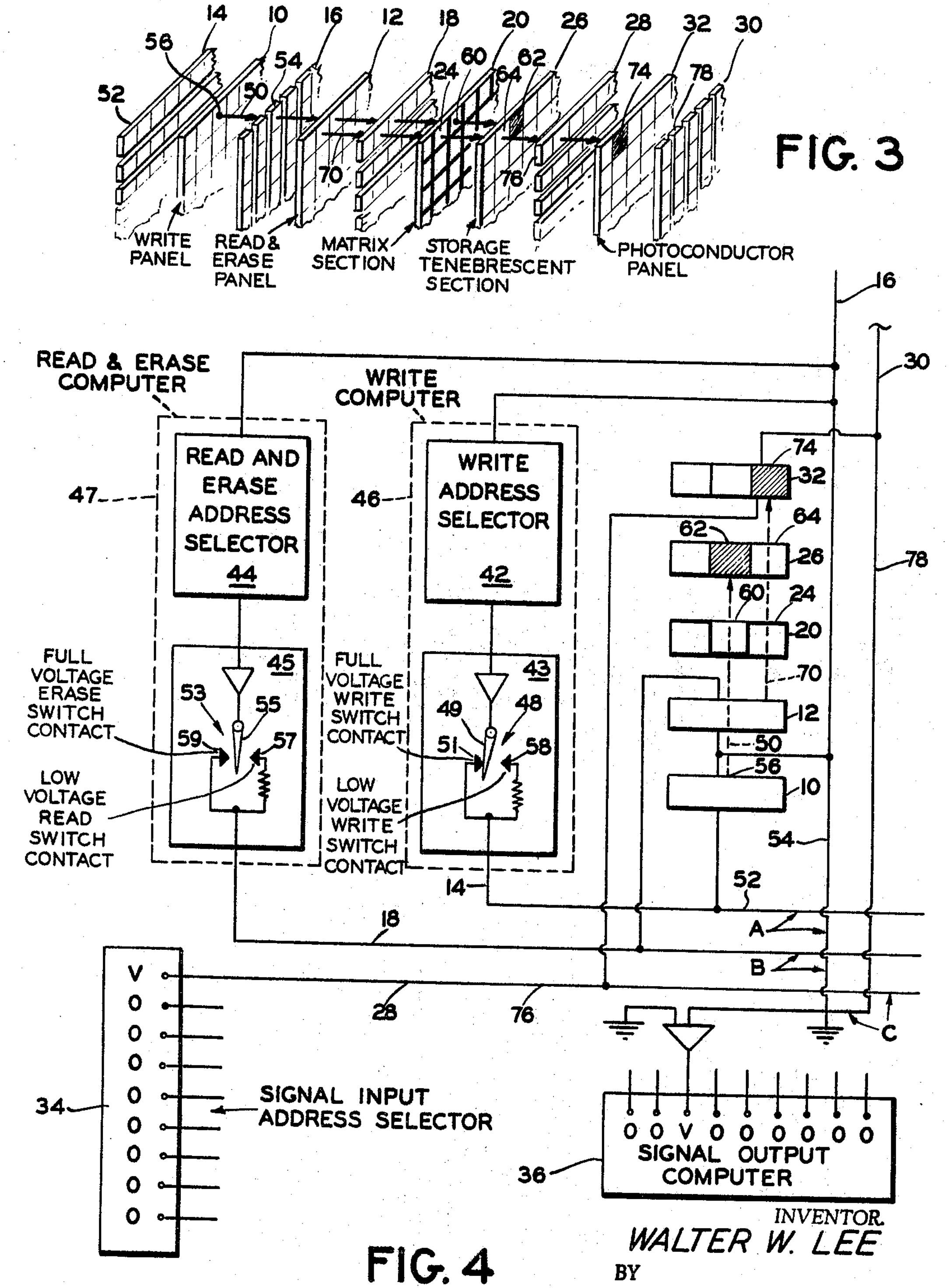
FIGURE 3 is a schematic of an optical path of bits of information projected within the memory system; and, FIGURE 4 shows a schematic of an optoelectric circuit of the bits of information projected within the memory system as shown in FIGURE 3.

Referring, in addition to FIGURES 1 and 2, to FIGURE 3 and to the optoelectric circuit shown in FIGURE 4, it should be seen that in order for the memory system to be used to write bits of information on the tenebrescent panel 26, the write electroluminescent panel 10 must be activated by a first or write computer means 46, comprising a write address selector 42 cooperating with a write switching means 43, to apply "write" information voltage signals or pulses to the X-axis conductors 14 and the Y-axis conductors 16. In order for the memory system to be used to read and erase, the read and erase electroluminescent panel 12 must be activated by a second or read and erase computer means 47, comprising a read and erase address selector 44 cooperating with a read and erase switching means 45, to apply "read" or "erase" information voltage signals or pulses to the X-axis conductors 18, and the Y-axis conductors 16.

Therefore, in order for the memory system to read in, write in, or erase a bit of information, a voltage is applied through the computers 46 and 47 between a conductor in the Y-axis direction 16 and a conductor in either of the X-axis conductors 14 or 18. The X-axis conductor energized is the one separated from the Y-axis conductor by the electroluminescent material 10 or 12 whose spectral response is appropriate to the function to be performed. The voltage applied should be high enough to enable the writing or erasing action to take place quickly.

In order to write in a bit of information, a voltage is applied to the write electroluminescent panel 10 by the write computer means 46. In order to read in a bit of information, a voltage is applied to the read and erase panel 12 by the read and erase computer means 47. The electroluminescent panels 10 and 12 will typically have spectral responses which lie in the spectral area to which photoconductors are sensitive. The intensity of the light of the read and erase electroluminescent panel 12 will be considerably less for reading than when this light is being used for the erase mode.

As is clear from the foregoing, there will be a certain tendency for written bits of information to bleach while they are being read. This may be counteracted in any number of ways. Periodic rewriting may be employed or means may be used to activate the write electroluminescent material 10 continually so that the tenebrescent material 26 will see an equal amount of writing and bleaching radiation. This will result in having the tenebrescent material 26 remain unchanged in whichever state it happens to be in.

Referring again to the drawing, it can be seen that FIGURE 4 shows the memory system in the write mode by having the write computer means 46 close a write switch 48 by positioning a write switch arm 49 to close a fuse voltage write switch contact 51, and the read and erase computer means 47 open a read and erase switch 53 by positioning a read and erase switch arm 55 in neutral. This will operate the memory system to write in one bit of information. That is, referring to FIGURE 3, a single write optical path, such as 50 will be initiated by closing the switch 48 as herein described and applying the voltage signal across an X-axis conductor 52 of the conductors 14 and a Y-axis conductor 54 of the conductors 16 as selected by the write computer means 46. The electroluminescent panel 10 will be activated at a pin point adjacent to the intersection of the X-axis conductor 52 and Y-axis conductor 54 to produce a bright light signal 56 at this point. A plurality of voltage signals may be applied in this manner into the memory system, according to a predetermined coded display, presented to the computer 46, relating to the information desired to be written into the system. In addition, as explained before, the voltage applied should be high enough to produce a bright light for quick writing. The bright light can travel through the transparent read and erase panel 12, past the transparent X-axis conductors 18, and through one aperture 60 of the matrix 20 with no effect until it impinges on the tenebrescent material 26 to darken or write thereon an opaque pin point micro-area 62 denoting a bit of information.

In this manner, the same "write" operation is followed to write other information obtained from the electrical circuit. The tenebrescent material 26 will be darkened in certain areas, such as micro-areas 62, and leave transparencies such as 64 adjacent to the darkened areas according to the information presented by the write computer 46. That is, the tenebrescent panel 26 will be transparent throughout its surface except at the darkened micro points, which are formed by the array of coded information light signals projected from the electroluminescent panel 10. These transparent and opaque areas correspond to the "ones" and "zeroes" of the binary system. The light produced by the electroluminescent panel, as hereinbefore stated, is ultra violet which produces the dark spots on the tenebrescent material 26. In detail, the tenebrescent material 26 now comprises an information mask having a plurality of coded opaque and transparent areas through which a light can be directed from the read and erase electroluminescent panel 12 onto the photodetector panel 32.

Thereby, to transfer the display of coded information written on the tenebrescent material 26 to the photoconductor 32, a low voltage is applied to the electroluminescent panel 12 which would produced a spectral response lying in the spectral area to which photoconductors are sensitive. It should be understood that the photoconductive material 32 in the dark has extremely high resistance to electric flow, usually measured in hundreds of megaohms, but in bright light, its resistance falls to a very low value, approaching that of metallic conductors. Therefore, any signal that is presented by the read and erase computer means 47 to the electroluminescent panel 12 will pass as a light signal through the memory system to impinge onto the photoconductor 32 to effect its resistance as herein more fully described.

It should be also be noted again that the matrix 20 is not an information mask as in my co-pending U.S. application Ser. No. 330,098, but merely acts as an opaque insulating means between adjacent bit points. The tenebrescent panel 26 provides for the storage of information as it is presented to it by the computers. That is, the matrix 20 provides for separate homogeneous screen type apertures for insulating the bit points from each other adjacent X and Y conductor intersections.

The light signals from the electroluminescent panel 12 pass the apertures of the matrix 20, to continue on through the transparent areas of the tenebrescent panel 26 onto the layer of photoconductive material 32. There, the light signals will impinge onto and effectively reduce the resistance of the photoconductive material at pin point areas where the transparent areas of the tenebrescent panel 26 permitted the light to pass. That is, the light will be absorbed by the photoconductive material 32, which was an insulator in the dark, and will penetrate the material at the pin point areas from one side to the other to reduce its resistance and thereby make it conductive at those pin point areas. Thereby, the photoconductor 32 will electrically connect an X-axis conductor to a Y-axis conductor at that point of light penetration. At those intersections of the conductors where the area is opaque, the conductors will be electrically insulated. Therefore, due to the low resistance of the photoconductor at the light penetration, a signal such as a voltage, applied to one of the horizontal or X-axis conductors 28, will produce a voltage only on the vertical or Y-axis conductor 30 at the exact intersection behind the transparent areas of the tenebrescent material 26. It should also be noted that in order to prevent "sneak pass" or other forms of short circuiting, it may be necessary to lay down the photoconductive material 32 in such a manner that it becomes a diode when in contact with one of the conductors. Another solution of the same problem is to use low impedance amplifiers and voltage sources. This will prevent spurious voltages from being transmitted.

As in my co-pending application Ser. No. 330,098, a single optical path 70, referring to FIGURES 3 and 4, will be projected from the electroluminescent panel 12 to travel through the transparent internal panels and conductors to impinge onto the photoconductive material 32. The light of the optical path 70 will travel only through a transparent area such as 64 on the tenebrescent material 26, which was not affected by any light signals projected from the electroluminescent panel 10. It should be noted at this time, that the information presented to the photoconductor 32 by the tenebrescent material 26, acting as an information mask, is in the form of dark or opaque bit information areas and not transparent bit information areas as in my co-pending application Ser. No. 330,098. The effect will be to provide "ones" and "zeros" of the binary system in a reversed manner, as the negative of a photograph. However, the result will be the same. That is, the light projected by the electroluminescent panel 12 will not travel through the opaque areas formed by the electroluminescent panel 10 on the tenebrescent panel 26, but will travel through the adjacent transparencies to produce conductive areas on the photoconductor 32.

In detail, referring again to FIGURES 3 and 4, to transfer one bit of information from the tenebrescent panel 26 to the photoconductor 32, the single optical path 70 projected as an increment of light is initiated at the light source or electroluminescent panel 12 by the read and erase computer means 47. The computer 47 closes the read and erase switch 53 by positioning the read and erase switch arm 55 to close a low voltage read switch contact 57. This will operate the memory system to provide the increment of light on the electroluminescent panel 12 to read in one bit of information onto the photoconductor 32. The light will then be directed through the transparent X-axis conductors 18, through the aperture such as 24 on the matrix 20, through the transparent area 64 adjacent the written opaque areas such as 62 of the tenebrescent material 26, through the transparent X-axis conductors 28 to impinge onto the photoconductor panel 32 at a pin point area 74. The light will then be absorbed by the photoconductor 32 only at the light exposed pin point area 74 to transfer this area into a conductor. An X-axis conductor 76 and a Y-axis conductor 78 being mechanically coupled to the photoconductor 32, will provide an electrical continuity for the computer means between the input signal address selector 34 and the output signal computer 36. In this manner, all the information display of the tenebrescent panel 26 will be transferred to the photoconductor 32.

The actual reading, of the bits of information just described, is accomplished in the same manner as in my co-pending application Ser. No. 330,098. That is, the voltage is sequentially switched on the address selector 34 to direct a voltage signal from one X-axis conductor to another X-axis conductor in accordance with a predetermined speed to scan all of the X-axis conductors.

When a signal is applied to an X-axis conductor such as the conductor 76, the signal will travel through low resistance points on the photoconductor 32 such as the low resistance area 74. Only the Y-axis conductors that are in line with the low resistance points of photoconductor material will receive the signal.

As shown in FIGURES 3 and 4, the voltage signal will therefore travel from the address selector 34 through the X-axis conductor 76, through the conductive pin point area 74 of the photoconductor 32, to the Y-axis conductor 78 to be read by the output signal computers 36. In this maner, the stored information on the tenebrescent panel 26 that was transferred to the photoconductor panel 32 is conveyed to the readout section R of the memory system.

From the foregoing, it should be noted that there will be a certain tendency for the written bits of information to be bleached while they are being read. This may be counteracted by periodic rewriting or by continuously activating the write electroluminescent panel 10 by the write computer 46. That is, when the memory system is in the read mode, the computer 46 can close the write switch 48 by positioning the write switch arm 49 to close a low voltage write switch contact 58 so that the tenebrescent material 26 will see an equal amount of writing and bleaching radiation and in this respect remain unchanged in whichever state it happens to be in.

To alter or erase the stored information on the tenebrescent material 26, a voltage is applied by the read and erase computer means 47 to the electroluminescent panel 12 of a higher intensity than the readout voltage, to produce a light to bleach out the opaque bits of information. Therefore, to erase the information written on the tenebrescent panel 26, the read and erase computer means 47 will close the read and erase switch 53 by positioning the read and erase switch arm 55 to close a full voltage erase switch contact 59, and the write computer means 46 will open the write switch 48 by positioning the write switch arm 49 in neutral. In this erase mode, the read and erase electroluminescent panel 12 will produce a brilliant light to bleach the tenebrescent panel 26 to its original transparent state. The low resistance conductive spots of the photoconductor 32 will also be erased by permitting the photoconductor 32 to remain in the dark for a short period of time. The system is now again ready to be used to write and read any information that may be presented therein.

Therefore, the purpose of this invention is to provide the application of tenebrescent material as an optical storage medium for computers, and to provide the technique for writing and erasing small information areas on the tenebrescent material by use of thin film electroluminescent light sources. In addition, this invention provides for the transfer of the information areas from the tenebrescent material onto a photoconductor material and for selectively guiding electrical signals from an input signal address selector to read the information areas by an output signal computer by means of X-axis and Y-axis conductors. The information being supplied to the memory system by the electroluminescent panels being connected to a write computer means and a read and erase computer means. This method of electronically inserting information for writing, reading, and erasing provides for a solid state enclosed optical memory system having random access time in the range of nanoseconds or faster.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An optical memory system for computers comprising, a first luminescent source operable to provide coded information through a predetermined pattern of light signals, a tenebrescent panel operable to receive the light signals and convert them into a pattern of darkened areas leaving transparent areas adjacent the darkened areas, a photoconductor, a second luminescent source operable to transfer the pattern of darkened and transparent areas from said tenebrescent panel to said photoconductor, a readout means operable to receive and convert the pattern into readable electronic signals, said first luminescent source including a first series of closely spaced parallel conductors extending in one direction, a second series of closely spaced parallel conductors extending transverse to the first series of conductors to form therewith intersections, a write electroluminescent panel, means selectively operable to apply a voltage to said first and second conductors to cause said write panel to fluoresce in a spectral band effective to present the light signals to said tenebrescent panels so as to be converted on the tenebrescent panel to said pattern of darkened areas for writing thereon the coded information.

2. A memory system defined by claim 1 wherein said second luminescent source comprises said second series of closely spaced parallel conductors, a third series of closely spaced parallel conductors extending transverse to said second series of conductors to form therewith intersections in line with the intersection formed by said first conductors with said second conductors, another electroluminescent panel having impurities for fluorescing in a spectral band which will present light signals that are of a different wave length than the light signals presented by said write electroluminescent panel, said other panel being interposed between said second conductors and said third conductors, and means selectively operable in one sense to present a relative low voltage to said second and third conductors to cause said other panel to fluoresce in a spectral bank effective to read the coded information on the tenebrescent panel by transferring the pattern of dark and transparent areas from said tenebrescent panel to said photoconductor and said last mentioned means being operable in another sense to present a relative large voltage to said second and third conductors to cause said other panel to fluoresce in a spectral band effective for bleaching the pattern of dark areas of the tenebrescent panel to a transparent condition, whereby said memory system can again be used to write and read the coded information that is presented to it.

3. A memory system defined by claim 1 wherein said second luminescent source comprises said second series of closely spaced parallel conductors, a third series of closely spaced parallel conductors extending transverse to said second series of conductors to form therewith intersections in line with the intersection formed by said first conductors with said second conductors, another electroluminescent panel having impurities for fluorescing in a spectral band which will present light signals that are of a different wave length than the light signals presented by said write electroluminescent panel, said other panel being interposed between said second conductors and said third conductors, and means selectively operable in one sense to present a relative low voltage to said second and third conductors to cause said other panel to fluoresce in a spectral band effective to read the coded information on the tenebrescent panel by transferring the pattern of dark and transparent areas from said tenebrescent panel to said photoconductor and said last mentioned means being operable in another sense to present a relative large voltage to said second and third conductors to cause said other panel to fluoresce in a spectral band effective for bleaching the pattern of dark areas of the tenebrescent panel to a transparent condition, whereby said memory system can again be used to write and read the coded information that is presented to it, a fourth plurality of substantially parallel conductors, a fifth plurality of substantially parallel conductors extending transverse to said fourth plurality of conductors forming therewith a plurality of intersections in line with the intersections formed by said first conductors with said second conductors, and the intersections formed by said second conductors with said third conductors, said photoconductor being interposed between and connecting said fourth plurality of conductors and said fifth plurality of conductors, wherein the light signals are directed from said other electroluminescent panel as pin point luminescents for absorption by said photoconductor at areas adjacent predetermined intersections to be absorbed by the photoconductor so as to become conductive to electrically connect the fourth and fifth conductors at said intersections.

4. A solid state random access erasable and rewritable optical memory system comprising a tenebrescent panel, a write control means for directing coded light signals onto said tenebrescent panel to darken said panel at predetermined areas presented by the coded light signals and to leave transparent areas adjacent the darkened areas, a photoconductor, a read and erase control means operable to direct a light through the transparent areas of said tenebrescent panel for a transfer of the coded light signals from the tenebrescent panel to said photoconductor, a computer means connected to said photoconductor operable for reading out the predetermined coded information transferred on said photoconductor, a write switching means operable to energize said write control means for presenting coded light signals to said tenebrescent panel and a read and erase switching means operable to energize said read and erase control means for transferring the coded light signals simultaneously with the writing of said signals by said write control means, whereby the information is continuously written as it is being read thereby effectively counteracting the bleaching tendency of the light of said read and erase control means.

5. A random access solid state erasable and rewritable optical memory system comprising a first luminescent source operable to direct a plurality of light signals through the memory system, a first computer means operable to feed electric signals into said first luminescent source for producing the light signals, a second luminescent source fluorescent in a spectral band in an opposite manner to the action of the first luminescent source and operable to direct other pluralities of light signals through the memory system, a second computer means operable to feed other electric signals into said second luminescent source for producing the other light signals, a tenebrescent panel operable to receive the light signals from said first luminescent source at predetermined areas depending on the light signals received from said first luminescent source and become darkened thereby while permitting the light signals from said second luminescent source to pass through the transparencies formed adjacent the darkened areas, said second computer means being operable to present a plurality of stronger electrical signals to bleach out the darkened areas of tenebrescent panel, whereby said first source and said second source can be operated by said first computer means and said second computer means respectively to produce thereby on said tenebrescent material information that can be written and erased.

6. The structure defined by claim 5 including means for reducing the light of the second luminescent source to another spectral region to provide said other light signals, a photoconductor, the other light signals being directed through the transparencies in the tenebrescent material onto the photoconductor, to write thereon, and means for reading the information written by second light signals on said photoconductor.

7. An optical memory system comprising a first computer means for directing write electrically energized coded information signals, a first set of crisscross conductors forming a first plurality of intersections operable to receive the write electrically energized coded information signal, a first write electroluminescent panel electrically operable through said first set of crisscross conductors to direct write information light signals at the intersections of said first set of crisscross conductors, the light being signals directed through the memory system, a second computer means for directing read and erase electrically energized coded information signals, a second set of crisscross conductors forming a second plurality of intersections in line with the first plurality of intersections and operable to receive the read and erase electrically energized coded information signals directed from said second computer means, a second read and erase electroluminescent panel electrically operable through said second set of crisscross conductors to direct read and erase information light signals at the intersections of said second set of crisscross conductors, a tenebrescent panel operable to receive the write light signals and forming thereon darkened areas leaving adjacent thereto transparencies denoting the "ones" and "zeros" of the binary system, and said tenebrescent panel being operable to receive the read and erase light information signals for reading the information written on said tenebrescent panel when said second computer means directs reading signals and for erasing the information on said tenebrescent panel upon said second computer means directing erase signals, a third set of crisscrossed electrical conductors forming a third plurality of intersections in line with said first and second pluralities of intersections, and a photoconductor interposed between said third set of conductors and operable for receiving read signals from said second read and erase electroluminescent panel for forming predetermined conductive bit areas on said photoconductor in accordance with the coded information areas on said first and second panels in line with the conductor intersections.

8. The structure of claim 7 wherein said photoconductor is operable to receive the read light signals from said first and second electroluminescent panels and to absorb said light signals in predetermined areas so as to become conductive at said predetermined areas and further comprising a third computer means for directing a voltage signal through said photoconductor to determine the information written thereon.

9. The structure of claim 8 wherein a homogeneous screen is inserted between said second electroluminescent panel and said tenebrescent panel for providing therewith a means for isolating the intersections of said conductors and for insulating one bit of information from another.

10. The combination defined by claim 9 wherein said write electroluminescent panel is formed of zinc sulfide compound providing thereby light signals in a spectral band which will render opaque said tenebrescent panel.

11. The combination defined by claim 10 wherein said read and erase electroluminescent panel is formed of zinc sulfide dopped with impurities which will fluoresce in a spectral band in an opposite manner to the action of said write electroluminescent panel to provide thereby a wave length that will be substantially ineffective to the tenebrescent panel at one voltage to direct a light through its transparencies to darken said photoconductive panel, and operable to bleach the tenebrescent panel at another substantially higher voltage than the read voltage.

12. The combination defined by claim 11 wherein said tenebrescent panel is formed of a layer of rhodium aluminum silicate.

13. The combination defined by claim 12 wherein said photoconductor panel is constructed of transparent fluid coating which is laid between the entire surface of said third set of conductors.

14. The combination defined by claim 13 wherein said first, second, and third set of conductors are fabricated of glass coated with transparent conductive paint.

15. The combination defined by claim 14 wherein said coating is transparent gold paint.

References Cited

UNITED STATES PATENTS

| | | | |
|---|---|---|---|
| 2,661,437 | 12/1953 | Beckers | 313—71 |
| 2,897,399 | 7/1959 | Garwin et al. | 350—160 |
| 3,185,026 | 5/1965 | Carlson et al. | 350—160 |

BERNARD KONICK, *Primary Examiner.*

J. F. BREIMAYER, *Assistant Examiner.*